(12) United States Patent
Harrer et al.

(10) Patent No.: US 8,815,428 B2
(45) Date of Patent: Aug. 26, 2014

(54) FRAME OF A CELL OF A REDOX FLOW BATTERY

(75) Inventors: Martin Harrer, Vienna (AT); Herbert Bucsich, Antau (AT)

(73) Assignee: Cellstrom GmbH, Wiener, Neudorf (AT)

( * ) Notice: Subject to any disclaimer, the term of this patent is extended or adjusted under 35 U.S.C. 154(b) by 105 days.

(21) Appl. No.: 13/328,612

(22) Filed: Dec. 16, 2011

(65) Prior Publication Data

US 2012/0156535 A1   Jun. 21, 2012

(30) Foreign Application Priority Data

Dec. 21, 2010 (AT) .................................. A 2106/2010

(51) Int. Cl.
| | |
|---|---|
| *H01M 8/18* | (2006.01) |
| *H01M 8/24* | (2006.01) |
| *H01M 8/20* | (2006.01) |
| *H01M 8/02* | (2006.01) |

(52) U.S. Cl.
CPC ................ *H01M 8/20* (2013.01); *H01M 8/188* (2013.01); *H01M 8/242* (2013.01); *H01M 8/0273* (2013.01); *Y02E 60/528* (2013.01)
USPC ............................................ 429/105; 429/185

(58) Field of Classification Search
USPC .................................................. 429/105, 185
See application file for complete search history.

(56) References Cited

FOREIGN PATENT DOCUMENTS

| | | | |
|---|---|---|---|
| AT | 501903 | | 12/2006 |
| JP | 57113565 A | * | 7/1982 |
| JP | 2005228645 A | * | 8/2005 |
| JP | 2006324129 A | * | 11/2006 |

* cited by examiner

*Primary Examiner* — Gregg Cantelmo
(74) *Attorney, Agent, or Firm* — Dykema Gossett PLLC

(57) ABSTRACT

For improving the energy efficiency of a cell of a redox flow battery it is desired that the electrolyte liquid flows to the greatest possible extent through the electrode and that there are no flow paths or leakages around the electrode. In order to achieve this, a frame of a cell of a redox flow battery is proposed, said frame having an opening 8 which is bordered by a rim 6, wherein on the rim 6, a first flow blocker 11 is arranged which extends into the opening 8, and a second flow blocker 16 is arranged in the distribution channel 9 in the region of the distribution channel's inflow region for supplying electrolyte liquid into the cell, or in the outflow region for discharging electrolyte liquid, wherein said flow blocker restricts the distribution channel 9 toward the opening 8.

7 Claims, 4 Drawing Sheets

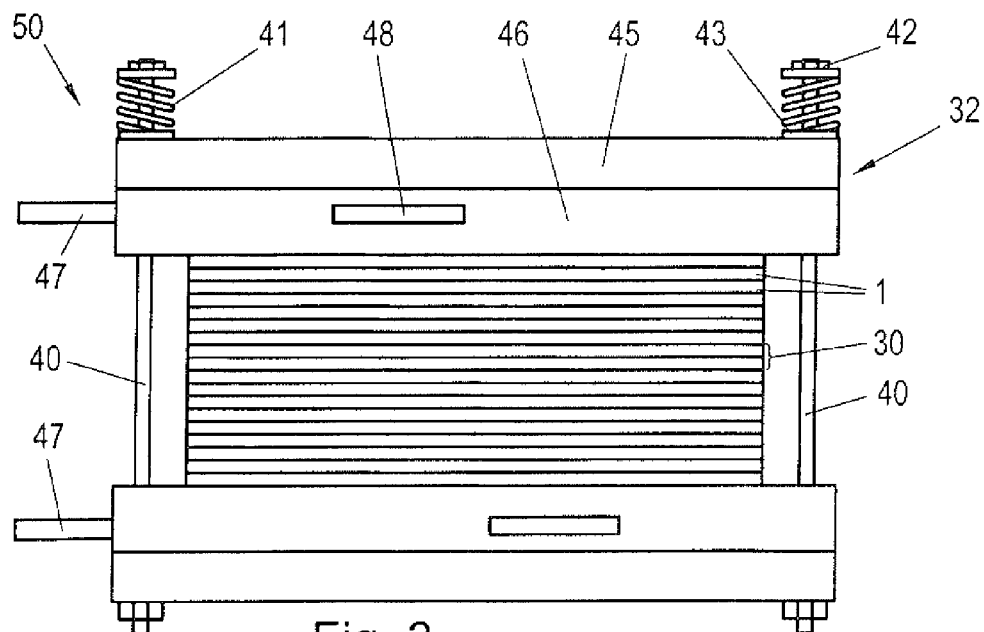
Fig. 3
(prior art)
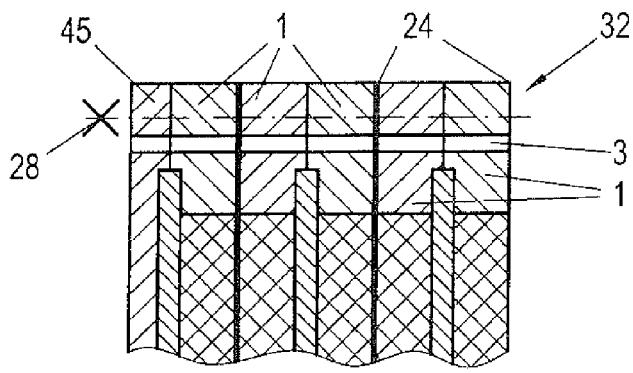
Fig. 4
(prior art)
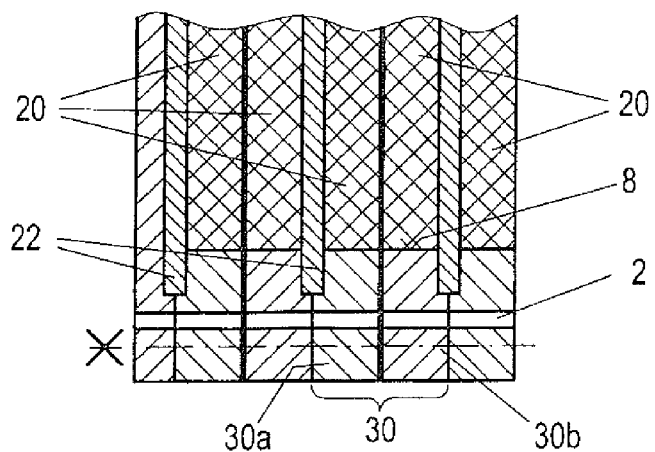

FRAME OF A CELL OF A REDOX FLOW BATTERY

BACKGROUND OF THE INVENTION

1. Field of the Invention

The present invention relates to a frame of a cell of a redox flow battery, the frame including an opening that is bordered by a rim, wherein at said rim, a first flow blocker is arranged at the rim which extends into the opening, and further including a distribution channel ending in the opening for supplying or discharging electrolyte liquid to or from the cell, and a semi-cell and a redox flow battery includinq such a frame.

2. The Prior Art

A known embodiment of a redox flow battery 50 or a stack 32 of a redox flow battery 50 is illustrated in the FIGS. 3 and 4. The cells 30 of such a stack 32 usually consist of two adjacent half cells 30a, 30b, wherein each half cell 30a, 30b is formed in each case from a frame 1 which has an opening 8 in which in each case one electrode 20 is arranged and wherein the half cells 30a, 30b are separated at least in the region of the opening 8 by a semi-permeable diaphragm 24. A first electrolyte liquid flows through the first half cell 30a of a cell 30 and a second electrolyte liquid flows through the second half cell 30b of said cell, wherein through electrochemical processes, electric current is generated which can be tapped via electrical connections 48 at the end plates 46 of the stack 32. In some types of redox flow batteries 50 such as, e.g. a vanadium redox battery or a vanadium/polyhalide battery, the two electrolyte liquids are chemically largely similar or have just a different oxidation state (e.g., $V^{2+}$ and $V^{3+}$, $VO_2^+$ and $VO^{2+}$). This process can also be reversed, whereby the electrolyte liquid (or the battery) is charged. A plurality of such cells 30 are combined in a redox flow battery 50 to form a stack 32 by arranging the individual cells 30 next to each other so as to achieve a higher power or voltage. The individual cells 30 are separated from each other by bipolar plates 22. The two electrolyte liquids with different charge states are supplied or discharged via connections 47 in the end plates 46 and conveyed through bores 2, 3 into the frame 1 and through the cells 30. The cells 30 are arranged between the two end-plates 46 or the pressure plates 45 resting thereon and can be pressed against each other by bolts 40 extending therethrough, which bolts are tightened by nuts 42, washers 43 and springs 41. Also, a plurality of stacks 32 can be combined in one redox battery 50, wherein a group of stacks 32 electrically connected in series is also called strings and a plurality of strings can be operated electrically in parallel. Such arrangements are well known in many different embodiments.

For increasing the efficiency or the energy efficiency of a redox battery, it is of course desirable that the entire circulated electrolyte liquid flows through the electrode and that there no leakage or no electrolyte liquid can bypass the electrode. Apart from leakages, in particular the regions between the electrode and the rim of the frame or the rim of the opening are problematic because it was found that between electrode and frame, a flow channel can be formed and therefore electrolyte liquid flows past the electrode and through the cell without being used.

From JP 2006-324 129 A, a frame of a redox flow battery is known which has an opening in which an electrode is inserted. Electrolyte liquid is supplied to the cell or discharged via distribution channels ending in said opening. In order to prevent that electrolyte liquid flows between frame and electrode, it is provided here to arrange a projection on the frame, wherein said projection extends into the opening and extends into a recess of the electrode. The electrode rests against the projection. However, up to said projection, the electrolyte liquid can still freely flow past the electrode, whereby a portion of the electrolyte liquid still remains unused.

Therefore, it is an object of the present invention to provide a frame of a cell of a redox flow battery which improves the utilization of the electrolyte liquid circulated by the cell.

SUMMARY OF THE INVENTION

This object is achieved according to the invention in that at the rim of the opening, a flow blocker is arranged which extends into the opening and which, in the assembled state with an electrode being in the opening, is pressed into said electrode, and wherein a further flow blocker is arranged in the distribution channel in the region of the distribution channel's inflow region for supplying electrolyte liquid into the cell or in the outflow region for discharging electrolyte liquid, wherein said flow blocker restricts the distribution channel toward the opening. Thus, on the one hand, the formation of a flow channel between opening and electrode is prevented and the electrolyte liquid is forced to flow through the electrode, which increases the efficiency or the energy efficiency of the cell and hence the redox flow battery. On the other hand, the electrolyte liquid is forced to flow first into the distribution channel where the electrolyte liquid is distributed and from where it can continue to flow into the electrode. In this manner it is prevented that electrolyte liquid in the inflow region or outflow region can bypass the electrode.

The formation of a flow channel between opening and electrode is prevented in the most effective manner if a flow blocker extends over the entire height of the opening.

BRIEF DESCRIPTION OF THE DRAWINGS

The present invention is described below with reference to the schematic, non-limiting FIGS. 1 and 2, which show a preferred exemplary embodiment. In the figures:

FIGS. 3 and 4 show an illustration of a stack of a known redox flow battery or, respectively, a detailed view therefrom.

DETAILED DESCRIPTION OF THE PREFERRED EMBODIMENT

Figure 1:
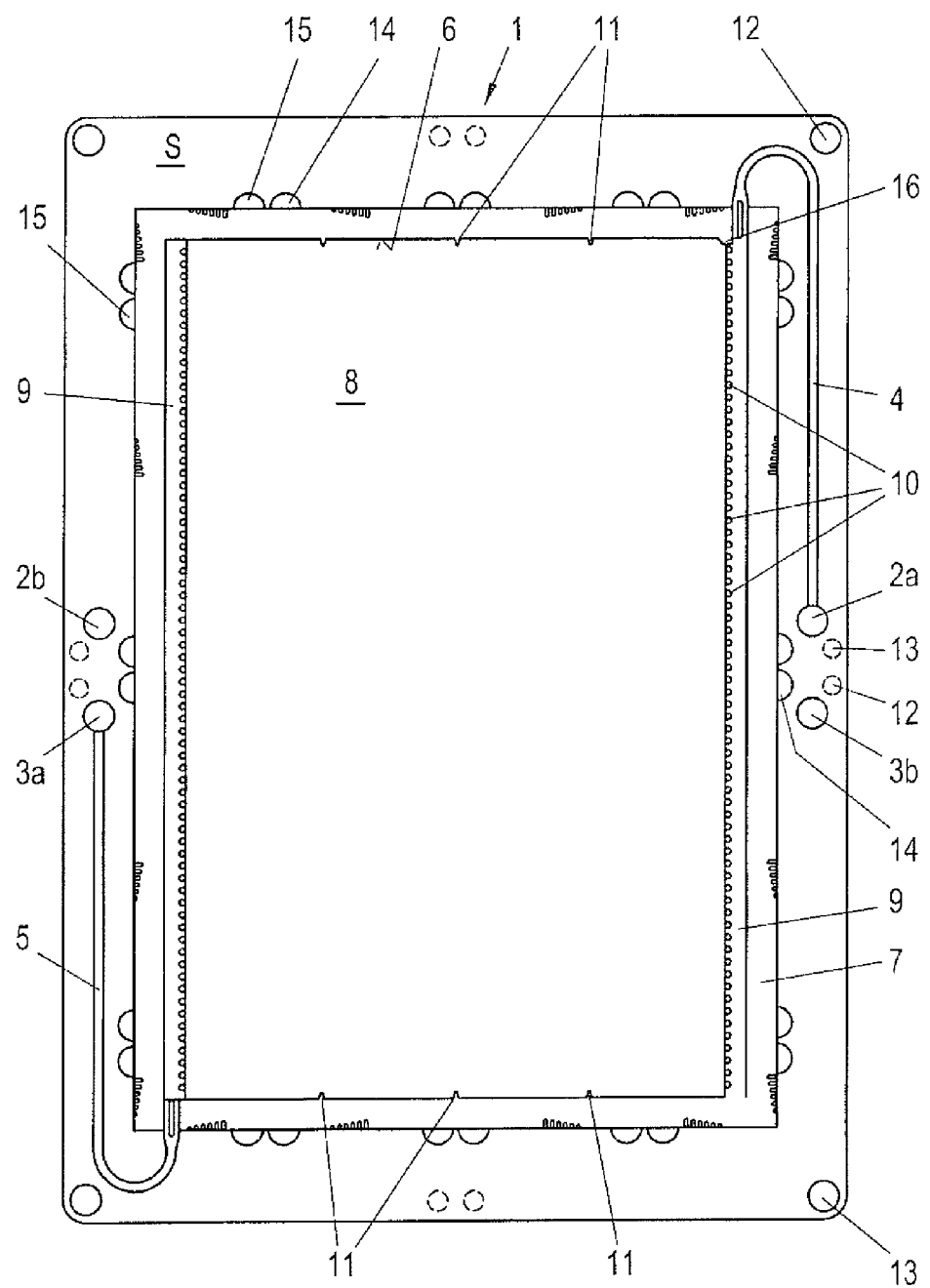
FIG. 1 shows a schematic side view of a frame according to the invention.

For describing the features of the frame 1 according to the invention, reference is made in the following to the FIGS. 1 and 2. The frame 1 is made from an elastomer such as, e.g., a polyolefin thermoplastic elastomer (TPE or TPO), such as, e.g., Santoprene or a thermoplastic vulcanizate (TPV), in particular by using an injection molding method. The frame material has a hardness in the range of 40- 95 Shore A, preferred 60- 75 Shore A. In the center of the frame 1, an opening 8 is provided in which an electrode 20, e.g., a mat of carbon fibers can be arranged (see FIG. 4). Around the opening 8, an indentation 7 can be provided in which a bipolar plate 22 can be arranged (see FIG. 4). Such a frame 1 with electrode 20 forms a half cell 30a, 30b of a cell 30 of a stack 32 of a redox flow battery 50, as described above.

Furthermore, the frame 1 has through-holes 2a, 3a through which, for supplying or discharging electrolyte liquid to or from the cells 30, electrolyte liquid is pumped through the stack 32. For example, the hole 2a serves for supplying and the hole 3a for discharging a first electrolyte liquid of a half cell. A second electrolyte liquid is conveyed through the holes 2b, 3b extending through the frame 1. In a front face S of the frame 1, channels 4, 5 are arranged, wherein a channel 4 is connected with one end to the supply hole 2a for supplying electrolyte liquid and forms a supply channel. The second channel 5 is arranged diametrically opposed and is connected to the discharge hole 3a for discharging electrolyte liquid and forms a discharge channel. Said channels 4, 5 can also be arranged in that portion of the front face S which is provided as a sealing surface. The following description of the channel 4 for supplying the electrolyte liquid applies equally to the channel 5 for discharging the electrolyte liquid. However, it is also possible to configure or arrange the supply and discharge channels differently.

The channel 4 is open toward the front face S and extends advantageously in a plane parallel to the front face S and ends in a vertical distribution channel 9 which is arranged along a side of the opening 8 and which is bordered toward the opening 8 by a plurality of stud links 10 arranged next to each other. The stud links 10 preferably extend from the bottom of the distribution channel 9 to the upper edge of the indentation 7 or to the front face S; however, it is also possible that they extend only over a portion of this height. The stud links 10 are intended to substantially prevent the electrode from sliding into the distribution channel 9 or is deformed in said channel, which would cause an non-uniform distribution of the electrolyte liquid, and that material flushed out of the electrode such as, e.g., fibers can get into the electrolyte liquid cycle or plug the channel.

Thus, the electrolyte liquid is supplied via the supply hole 2a, flows from there via the channel 4 into the distribution channel 9, is uniformly distributed there, and continues to flow to the electrode 20 arranged in the opening 8. The electrolyte liquid flows through the electrode 20, is collected at the opposing side via a further, preferably opposing distribution channel 9, and is discharged again via the discharge channel 5 and the discharge hole 3a.

Figure 2:
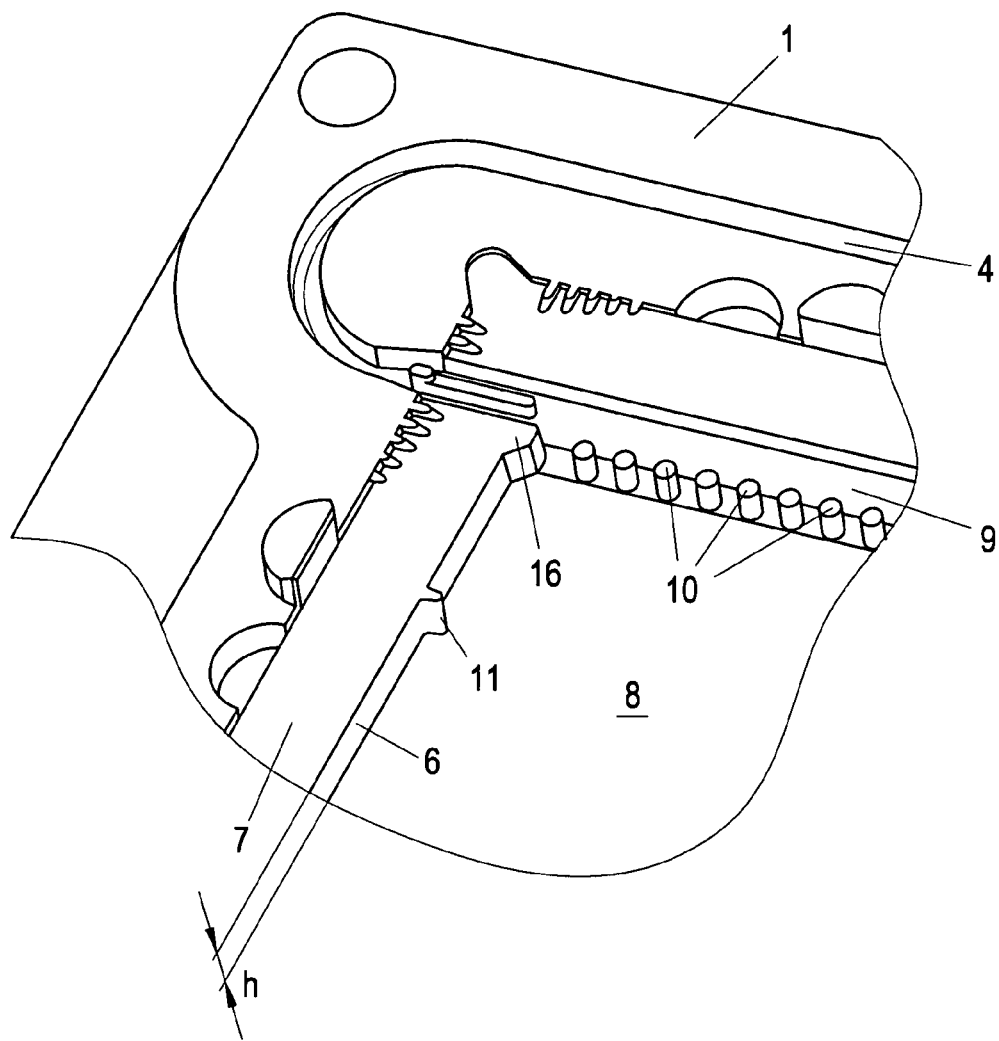
FIG. 2 shows a detail of the inflow region of the electrolyte supply of the frame in FIG. 1.

In order to avoid or prevent to the greatest possible extent that between frame 1, specifically the rim 6 of the opening 8, and the electrode 20 which, in the assembled state of the stack 32, is arranged in the opening 8 (see FIG. 4), a flow channel in the direction of the flow of the electrolyte liquid through the cell 30 is formed, flow blockers 11 configured as projections are provided on the rim 6 of the opening 8, as illustrated in FIGS. 1 and 2. The flow blockers 11 preferably extend over the entire height h of the opening 8 and from the rim 6 into the opening 8, thus transverse to the direction of the flow of the electrolyte liquid through the cell 30 or the half cell 30a, 30b.

By arranging the electrode 20, which normally completely fills the opening 8, in the frame 1, the flow blockers 11 are pushed into the electrode 20 and block a flow of electrolyte liquid between the rim 6 and the electrode 20 to the greatest possible extent.

Figure 2A:
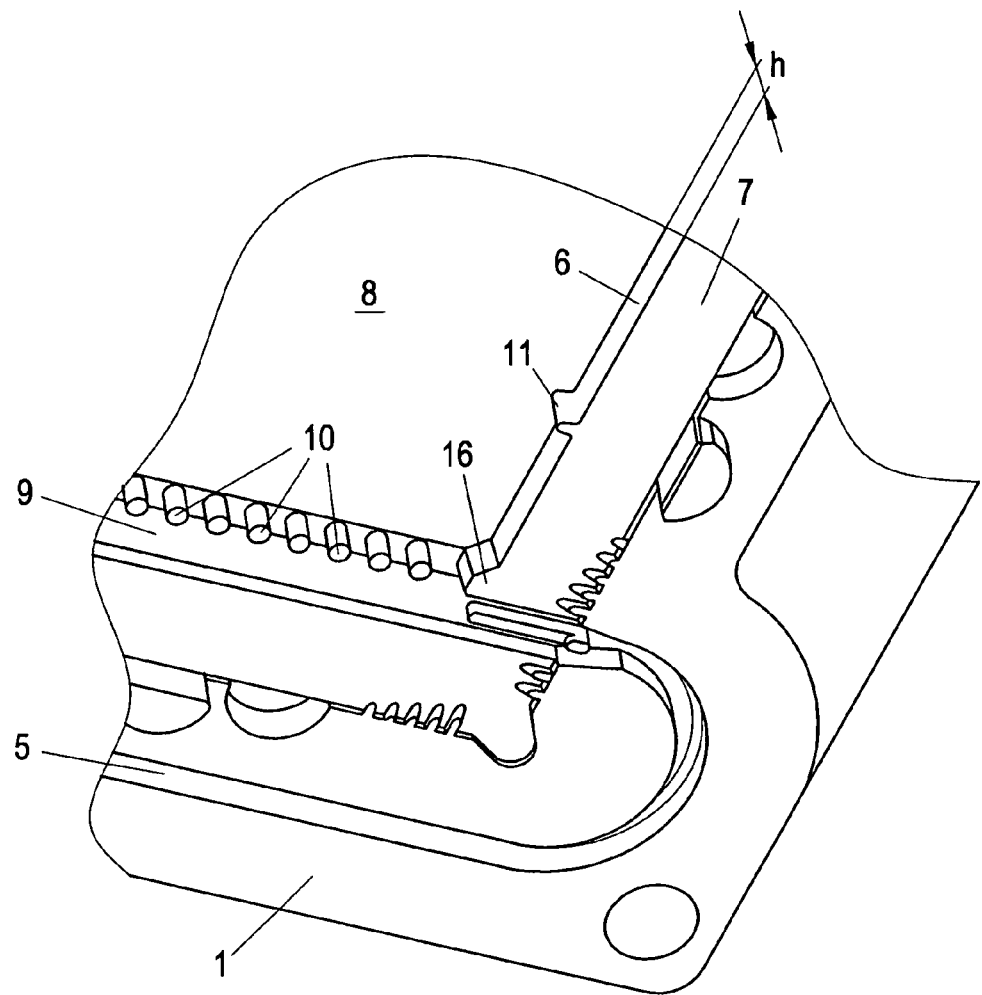
FIG. 2a shows a detailed view of the outflow region of the electrolyte discharge.

A further improvement for suppressing the formation of a flow channel between the frame and the electrode can be achieved if the rim 6 in the inflow region of the channel 4 extends into the distribution channel 9 so as to prevent the electrolyte liquid in the inflow region from flowing directly past the electrode 20. For this purpose, a further flow blocker 16 implemented as a projection is provided on the rim 6, wherein the further flow blocker extends into the distribution channel and restricts the distribution channel 9 in the inflow region of the latter toward the opening 8. Thus, the electrolyte liquid is forced to flow first into the distribution channel 9 and only from there can the electrolyte liquid get into the opening 8 or into the electrode 20. As illustrated in FIG. 2a, such a further flow blocker 16 can also be arranged at the outflow region of the channel 5.

The invention claimed is:

1. A frame for a cell of a redox flow battery, said frame including first, second, third and fourth inner sides enclosing a generally rectangular opening for an electrode, said frame comprising:
   a liquid inflow channel for delivering electrolyte to one end of a first distribution channel formed along said first inner side of said frame,
   a liquid outflow channel for removing electrolyte from a second distribution channel formed along said second inner side of said frame, said second inner side being opposite said first inner side, such that electrolyte delivered to said first distribution channel from said inflow channel will flow from said first distribution channel across said opening and through an electrode located therein to said second distribution channel and out through said liquid outflow channel, and
   a first rim providing said third inner side of said frame and including a plurality of first flow blocker means which extend along an entire height of said first rim and project into said opening to block electrolyte from flowing from said first distribution channel to said second distribution channel between said first rim and an adjacent peripheral surface of an electrode when positioned in said opening, one of said plurality of flow blocker means being located at an end of said first rim adjacent said one end of said first distribution channel where said inflow channel delivers electrolyte.

2. A redox flow battery comprising a half cell comprising a frame according to claim 1, and an electrode positioned in the opening of the frame.

3. A half cell of a redox flow battery, said half cell comprising a frame according to claim 1, and an electrode positioned in the opening of the frame.

4. The frame according to claim 1, including a second rim providing said fourth inner side of said frame and including a plurality of second flow blocker means which extend along an entire height of said second rim and project into said opening to block electrolyte from flowing from said first distribution channel to said second distribution channel between said second rim and an adjacent peripheral surface of an electrode when positioned in said opening, one of said plurality of second flow blocker means being located at an end of said second rim adjacent said second distribution channel where said outflow channel removes electrolyte.

5. The frame according to claim 4, including a plurality of second spaced stud links positioned between said second distribution channel and said opening.

6. The frame according to claim 1, including a plurality of first spaced stud links positioned between said first distribution channel and said opening.

7. The frame according to claim 6, including a plurality of second spaced stud links positioned between said second distribution channel and said opening.

* * * * *